(12) United States Patent
Wallerand et al.

(10) Patent No.: US 6,185,928 B1
(45) Date of Patent: Feb. 13, 2001

(54) METHOD AND DEVICE FOR DETECTING MISFIRES IN A CONTROLLED-IGNITION INTERNAL COMBUSTION ENGINE

(75) Inventors: Philippe Wallerand, Sartrouville; Christophe Genin, Noisiel, both of (FR)

(73) Assignee: Magneti Marelli France, Nanterre, Cedex (FR)

(*) Notice: Under 35 U.S.C. 154(b), the term of this patent shall be extended for 0 days.

(21) Appl. No.: 08/776,661

(22) PCT Filed: Aug. 2, 1995

(86) PCT No.: PCT/FR95/01041

§ 371 Date: Apr. 3, 1997

§ 102(e) Date: Apr. 3, 1997

(87) PCT Pub. No.: WO96/04539

PCT Pub. Date: Feb. 15, 1996

(30) Foreign Application Priority Data

Aug. 3, 1994 (FR) .................................. 94 09645

(51) Int. Cl.$^7$ ........................................ F01N 3/00
(52) U.S. Cl. ................... 60/274; 123/419; 123/436; 73/117.3
(58) Field of Search .................. 60/274; 123/419, 123/436; 73/117.3

(56) References Cited

U.S. PATENT DOCUMENTS

| 5,385,130 | * | 1/1995 | Hornewer et al. | 123/436 |
| 5,425,340 | * | 6/1995 | Petitbon et al. | 123/436 |
| 5,606,119 | * | 2/1997 | Wallerand et al. | 73/117.3 |

FOREIGN PATENT DOCUMENTS 2681425    3/1993  (FR) .

* cited by examiner

Primary Examiner—Thomas E. Denion
(74) Attorney, Agent, or Firm—Larson & Taylor PLC

(57) ABSTRACT

Gas torque (Cg) is determined for each cylinder combustion. Engine speed (N) and air admission manifold pressure (Pca) are measured during the corresponding prior admission phase. A reference torque (Cref), which is a function of N and Pca, is cartographically calculated by interpolation. The reference torque Cref, for example, is corrected by multiplication with a coefficient (KM) associated with the corresponding cylinder in a stabilized engine operating mode. In a transient mode, an additive correction (KA) is also made to derive the expected theoretical torque (Cpr), which is compared with the gas torque (Cg) so as to determine that misfire has occurred if Cpr/Cg>S2, where S2 is a threshold value. The process and device are suitable for generating signals representative of engine operation or indicating that the threshold level of harmful components discharged into the exhaust gases is exceeded.

22 Claims, 4 Drawing Sheets

METHOD AND DEVICE FOR DETECTING MISFIRES IN A CONTROLLED-IGNITION INTERNAL COMBUSTION ENGINE

FIELD OF THE INVENTION

The invention relates to a method and to a device for detecting misfires in an internal combustion engine of the so-called controlled-ignition, or alternatively spark-ignition, type for a motor vehicle, and in particular for a vehicle in which the engine is, on the one hand, associated with a catalytic exhaust system, called a catalytic converter in the rest of the description and, on the other hand, equipped with a fuel-injection type fuel supply system, preferably of the so-called "multi-point" type, and such that the engine injection and preferably also ignition are controlled by an electronic control and management system known as an engine management system.

BACKGROUND OF THE INVENTION

The detection of misfires in all combustion engines has become a major problem, owing to the most recent or pending legislation regarding environmental protection with which these engines, associated with catalytic converters, have to comply.

Now it is known that the occurrence of misfires may lead to deterioration of the catalytic converter, or even destruction thereof in the event of successive misfires on account of quantities, which may be excessive, of unburnt fuel mixtures resulting from these misfires reaching the catalytic converter. This deterioration or destruction of the catalytic converter leads to uncontrolled emanation of pollutants in the exhaust gases, and therefore to the vehicle no longer complying with legislation.

The overall problem upon which the invention is based is that of proposing a method and a device for detecting misfires, making it possible to alert the driver in the event of a risk of degrading the catalytic converter through misfiring and/or of excessively increasing a polluting emission.

From WO-A-94 16209, there is already known a method for detecting misfires in a controlled-ignition internal combustion engine, comprising the steps consisting in:
  a) formulating, for each combustion/expansion phase in each cylinder of the engine, a signal representative of the value of the gas torque Cg produced in the corresponding cylinder by the corresponding combustion,
  b) measuring the rotational speed N of the engine and formulating a signal representative of this speed for at least the inlet phase which preceded the combustion/expansion phase in the corresponding cylinder,
  c) measuring a parameter representative of the unitary filling of the corresponding cylinder and formulating a signal representative of this unitary filling for at least the inlet phase which preceded the combustion/expansion phase during the same engine cycle in the corresponding cylinder,
  d) entering the signals representative of speed N and of unitary filling as addresses in a reference theoretical gas torque map, and deducing therefrom a signal representative of a reference torque Cref.

This known method consists additionally in:
  e) assigning to the reference torque Cref a multiplicative weighting coefficient K associated with the corresponding cylinder and/or with whether the engine is running in stabilized or transient mode, and in deducing therefrom a signal representative of an expected theoretical torque Cpr, and
  f) comparing the signals of the measured gas torque Cg and of the expected theoretical torque Cpr and deeming there to be a misfire when the ratio of the gas torque Cg to the expected theoretical torque Cpr drops below a given ratio threshold.

SUMMARY OF THE INVENTION

The object of the invention is to improve the detection and the ability to discern misfires of the aforementioned known method, particularly so as to take account of whether the engine is running in transient or in stabilized mode.

To this end, the method according to the invention, which comprises the steps a) to d) of the known method given hereinabove, is characterized in that it additionally comprises the steps consisting in:
  e) assigning to at least one of the signals representative of the value of the gas torque Cg and of the reference torque Cref a respective multiplicative correction factor KM associated with the corresponding cylinder 80 as to obtain signals which are proportional to the value of the gas torque Cg and to the reference torque Cref, and, in addition, assigning to at least one of the proportional signals, an additive correction factor KA when the engine is running in transient mode, and deducing therefrom a signal representative of an expected theoretical torque Cpr on the basis of the signal which is proportional to the reference torque-Cref, and a signal representative of a calculated gas torque Cgc on the basis of the signal which is proportional to the value of the gas torque Cg,
  f) calculating the ratio of the signal representative of the expected theoretical torque Cpr to the signal representative of the calculated gas torque Cgc, and deeming there to be a misfire when this ratio is higher than a given ratio threshold.

This ratio threshold may be constant, for example equal to 2, but it is advantageously taken from a map established as a function of the rotational speed N of the engine and of a parameter representative of the unitary filling of the cylinders of the engine.

This parameter representative of the unitary filling of the cylinders may be the flow rate of air let into the engine or the degree of openness of a rotary choke or butterfly valve regulating the air supply to the engine, but advantageously this parameter is the pressure Pim at the air inlet manifold for the corresponding cylinder.

Although the signal representative of the value of the gas torque Cg may be the only one to have assigned to it the multiplicative correction factor KM and, in transient mode, the additive correction factor KA, in which event the expected theoretical torque Cpr is equal to the reference torque Cref and Cref/Cgc is calculated so as to compare it to the aforementioned threshold, advantageously the signal representative of the reference torque Cref is the only one of the representative signals to have assigned to it the multiplicative correction factor and, when the engine is running in transient mode, the corresponding proportional signal is also the only one to have assigned to it the additive correction factor. In such an event, Cg=Cgc, and Cpr/Cg is compared with the aforementioned threshold.

It will be understood that the idea upon which the invention is based consists in anticipating or estimating, for each combustion/expansion phase, an expected theoretical gas torque as a function of the rotational speed of the engine, or speed, of the chosen parameter representative of the unitary filling of the cylinders, and of correction factors, of which a first, multiplicative factor, takes into account the state of each of the cylinders of the engine for the corresponding combustion/expansion phases, while the second, additive factor, is taken into account when the engine is running in a transient mode, and that this expected torque is then advantageously compared with the calculated gas torque for the combustion/expansion phase under consideration in order to deduce, from the value of their ratio, whether or not there has been a misfire during this phase, as a function of the result of the comparison of this ratio with the threshold.

Advantageously too, the signal representative of the calculated gas torque Cgc for each combustion/expansion phase in each cylinder of the engine is formulated on the basis of the signal relating to the angular position of the crankshaft or of the shaft of the engine. This characteristic is advantageous in that it makes it possible to calculate the gas torque on the basis of this angular position signal alone, without it being necessary to provide other means such as pressure sensors taking pressure readings in the combustion chambers.

However, when the signal relating to the angular position of the shaft of the engine is obtained with the aid of a known sensor comprising a target rotating integrally with the crankshaft or with the flywheel, the formulation of the signal representative of the calculated gas torque Cgc is disturbed by the machining tolerances and the tolerances on the centering of the rotating target, and more generally of the rotary assembly comprising the target and the engine with which the target is rotationally linked, and in order to compensate at least in part for the speed fluctuations resulting from these tolerances, the method advantageously consists in addition in calculating the gas torque (Cg) for each of the angular sectors of rotation of the engine corresponding respectively to a combustion/expansion phase of each cylinder of the engine, and over at least one engine cycle, with fuel injection being cut off at least at a given engine speed which is higher than a speed close to low idle, in calculating the mean of the gas torques (Cg) for all of the angular sectors, in defining, for each sector, a compensation term which is equal to the product of the difference between the mean of the torques and the gas torque for this sector times a proportionality coefficient which is equal to 1 or a function of the load and/or the speed (N) of the engine, and in adding, for each sector, the corresponding compensation term to the gas torque (Cg) obtained in the injection phase for this sector over at least one speed range containing the speeds for which the fuel-injection cut-off was applied.

In the case of a four-stroke four-cylinder engine, and in a simple way, it consists in calculating the gas torque (Cg) for each of at least two successive engine half revolutions, with the fuel injection cut off, in calculating half of the resulting torque variation from one engine half revolution to the next, in defining the compensation term as being equal to the product of half the torque variation times the proportionality coefficient, and in adding the compensation term to the gas torque values (Cg) obtained during fuel-injection phase for the engine half revolutions which gave the lowest gas torque value in the phase during which the fuel injection was cut off, or respectively in taking the compensation term away from the gas torque values (Cg) obtained in the fuel-injection phase for the engine half revolutions giving the highest gas torque value (Cg) in the phase when fuel injection was cut off, over said speed range.

Advantageously in addition, the reference torque signals Cref can easily be deduced from an overall torque map for all of the cylinders of the engine and valid for a family of engines, this map being preestablished with the engine at a stabilized speed and stored in memory in the form of a tabulated map with two entries expressing the values of the theoretical reference gas torque for different input values, on the one hand, of the engine speed N and, on the other hand, the pressure at the inlet manifold Pim, which values are selected in order to optimize the calculation of the reference torque Cref by linear interpolation. The values or points on the map are in effect chosen to be close together in regions where the map has steep curvature so as to allow linear interpretation with minimum errors.

In order to compensate for spread between cylinders, between engines, and also for the ageing of the engine, the multiplicative correction factor KM in recalculated for each combustion/expansion phase of the engine. It makes it possible to calculate a value Cpr.slow which is the value adopted by the expected theoretical torque Cpr when the engine is running in stabilized mode. To compensate for transient running, the additive correction factor KA is recalculated for each combustion/expansion phase. It is added to Cpr.slow to give a value Cex.fast, which is the value adopted by the expected theoretical torque Cpr when the engine is running in transient mode. Whether the engine is running in stabilized or transient mode is determined as a function of the difference, preferably in absolute value, between two values of the reference torque Cref which are calculated, one of them for the combustion/expansion phase under consideration, and the other for the previous last but one combustion/expansion phase. The mode is deemed to be transient if this difference is higher than a threshold and to be stabilized if this difference is below said threshold, from a given number of consecutive engine cycles.

In a simple way, the multiplicative correction factor is calculated as being equal to the mean of a given number of the latest consecutive Cg/Cref ratios for the cylinder corresponding to the combustion/expansion phase under consideration. By contrast, the additive correction factor used in transient mode is equal to the first-order filtering of the difference between the signals representative of the calculated gas torque Cgc and of the expected theoretical torque Cpr at stabilized speed, independently of the cylinders.

This method of updating and of individualizing the correction factors involves a step consisting in storing in memory a given number of the latest successive values of the Cg/Cref ratio and of the latest value of the additive correction factor which are needed to calculate the correction factors. However, in order not to introduce erroneous values of the gas torque Cg, corresponding to exceptional conditions, when calculating the correction factors, and therefore in order not to invalidate this calculation, the corresponding calculated value of the expected torque Cpr is furthermore advantageously stored in place of a value of the gas torque Cg if a misfire is detected for this value of Cg.

In order to alert the driver of the vehicle, the engine of which is associated with the catalytic converter, the method consists, in addition:

in measuring the number of misfires or level of misfires detected during windows of respectively N1 and N2 engine revolutions, for example 200 and 1000 revolutions, in comparing each of these measurements with at least one threshold specific to each window, and in giving a warning signal corresponding to a critical state of the catalytic converter in the event of the threshold specific to the N1-revolutions window being exceeded, and/or a warning signal corresponding to a threshold of the emission of harmful components in the exhaust gases being exceeded in the case of the threshold specific to the N2-revolutions window being exceeded.

As the detection of misfires is not reliable across the entire operating range of the engine, particularly in steep transience (for example maneuvers of the gear lever) or when the engine is being strongly driven, it is advantageous for the method to be capable of allowing the detection of misfires to be deactivated in phases in which fuel injection is cut off and/or in phases in which the engine is being driven. According to the invention, the latter phase is advantageously detected when the pressure at the inlet manifold Pim drops below a pressure threshold which is a function of the rotational speed N of the engine and/or when the expected torque Cpr is lower than a limiting torque, which may, for example, correspond to the calculated gas torque for zero useful torque for the same rotational speed N of the engine.

To make it easier to detect whether the engine is in the driving state or being driven, the method advantageously comprises the additional step consisting in entering the speed signal N as an address into a single-entry table expressing the values of the limiting torque for different values of the speed N of the engine, and in deducing therefrom, by interpolation, preferably linear interpolation, a signal representative of the limiting torque Clim which is compared with the expected theoretical torque Cpr in order to deduce therefrom whether the engine is driving or being driven depending on whether Cex is greater than, or is lower than Clim.

In the event that the engine is being strongly driven, the method advantageously allows the detection of misfires to be deactivated if the expected torque Cpr is less than the product of the limiting torque Clim times a factor which is less than or equal to 1, and for example constant.

Likewise, in the event of steep transients (gearshifts for example), the method makes it possible to deactivate the detection of misfires if the absolute value of the difference between the reference torques Cref for the combustion/expansion phases of order n (the last one considered) and of order n−2 is above a threshold which may, for example, be equal to the threshold used to discriminate between stabilized or transient mode.

The method also makes it possible to deactivate the detection of misfires in the event of excessive drift in the signals representative of the calculated gas torque Cgc and of the expected theoretical torque Cpr one with respect to the other. To this end, there is deemed to be an excessive drift when the mean value of the ratio (Cgc−Cpr)/Cgc calculated for a given number of the latest combustion/expansion phases exceeds a calibration threshold, and the detection of misfires is reactivated as soon as this mean value drops back below the calibration threshold, which may be constant, for example 0.4 or 40% or fixed at a percentage of the misfire-detection threshold with which the Cpr/Cgc ratio is compared, particularly when this misfire-detection threshold is taken from a map, as mentioned hereinabove.

Finally, when the method of the invention comprises a learning step making it possible to compensate from discrepancies in Cgc attributable to the manufacturing tolerances and to the tolerances in centering the target of the crankshaft position detector, as mentioned hereinabove, the method also comprises a step consisting in deactivating the detection of misfires for as long as there has been no definition of at least one factor for compensating for variations in torque when fuel injection is cut off, therefore as long as there has been no switch into fuel-injection cut-off mode in one or more speed ranges set aside for learning compensation sensitive to assymmetries in the target.

Another subject of the invention is the device for detecting misfires, intended for the implementation of the method specific to the invention, for two-stroke or four-stroke engines having at least one cylinder, and as set out hereinabove, and which is characterized in that it comprises:

at least one sensor for sensing the rotational speed of the engine, delivering a speed signal N, at least one sensor for sensing a parameter representative of the unitary filling of the cylinders of the engine, such as a sensor sensing the pressure at the air inlet manifold, an air inlet flow meter or a sensor for sensing the butterfly valve angle, delivering a signal representative of this parameter, means for calculating the gas torque Cg, on the basis of the engine speed signal N, memory means for storing maps and thresholds, calculation means and comparison means making it possible to calculate and/or to store values of the reference torque Cref, of the expected torque Cpr, of the calculated gas torque Cgc, of the multiplicative correction factor (KM) and additive correction factor (KA) and of the Cpr/Cgc ratio and to compare them with thresholds in order to determine the presence of misfires.

BRIEF DESCRIPTION OF THE DRAWINGS

The invention will be better understood and other advantages and characteristics of the invention will emerge from reading the description given hereinbelow, without implied limitation, of one embodiment which is described with reference to the appended drawings in which.

DESCRIPTION OF THE PREFERRED EMBODIMENTS

Figure 1:
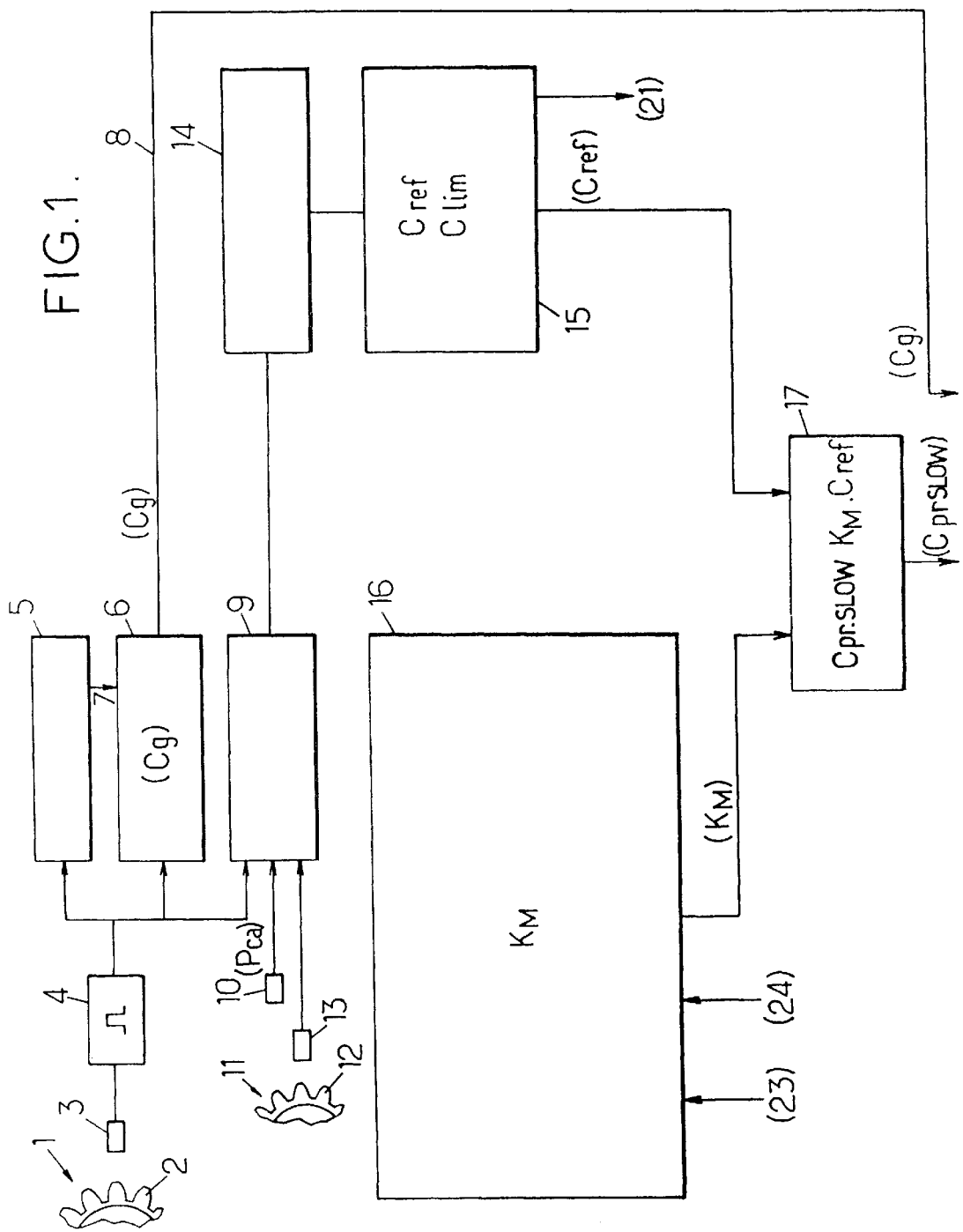
FIGS. 1 to 4 represent the four complementary parts of one and the same flow chart representing the steps of the method and the means used to implement it for detecting misfires in a four-cylinder engine having four strokes per engine revolution, at least the ignition and injection of which are controlled by an engine management system.

Represented as 1 in FIG. 1 is a detector 1 for detecting the angular position of the crankshaft of the engine, of a type which is well known and already equipped in most motor vehicles, associated with an electronic management circuit and comprising a tachymetric target produced in the form of a wheel 2 with singular features, toothed in this example, rotationally integral with the flywheel or with the crankshaft of the engine, as well as a sensor 3 fixed to the engine, the detector 1 being of the variable-reluctance type in which the sensor 3 is sensitive to the teeth of the wheel 2 running past it and delivers a pulsed electrical signal of variable frequency proportional to the speed N of the engine, this signal being shaped in a circuit 4 delivering the signal regarding the engine position to the rest of the device. In particular, the position signal is delivered to the engine management unit 5, controlling injection and ignition in the engine. In parallel, the position signal is sent to a stage 6 for calculating the gas torque Cg produced by each combustion/expansion phase in each cylinder of the engine for all the cycles thereof. The stage 6, known as the gas torque software sensor is therefore a computer which calculates the gas torque on the basis of the position signal. As the engine is of the sort which comprises measurement marks, such as the teeth of the wheel 2, arranged on a wheel or crown gear integral with the flywheel or with the crankshaft, means, such as teeth of a specific width of the wheel 2, for defining a reference for indexing the marks, and a sensor 3 detecting the passage of the marks, mounted stationary close to the wheel or crown gear 2, the signal-processing circuit contained within the stage 6 employs a method of producing a value representative of the gas torque Cg generated by each combustion of the gaseous mixture in the cylinders of the internal combustion engine, this method being like the one, for example, described in the patent FR 2,681,425 incorporated into the present description by way of reference, and to which reference will be made for further details.

The stage 6 also contains calculation and memory means allowing it to compensate, by learning, for defects in symmetry of the tachymetric target 2 of the engine position sensor 1. How this is done is that the gas torque Cg is calculated for each combustion/expansion phase over a corresponding engine half revolution—in this example of a four-stroke four-cylinder engine, either on one half or on the other half of the periphery of the wheel 2—on the basis of a singular feature identifying that a reference cylinder is passing through top dead center. Now, the manufacturing tolerances and tolerances on the centering of the wheel 2 (dimensional spread due to the machining of the teeth, eccentricity on the flywheel or crankshaft and dimensional spread or eccentricity of the rotating parts of the engine) mean that even for two strictly identical successive combustion/expansion phases, the resulting speed measurements are not identical and fluctuate for two cylinders with respect to those obtained for the other two cylinders. The learning principle employed consists in assessing the asymmetry of the rotating target 2 in the phase for which fuel injection is cut off, this phase being controlled by the engine management unit 5 for example when the driver lifts his foot off the throttle at high speed. The stage 6 which receives at 7 from the unit 5 the information that fuel injection has been cut off, calibrates the compensation by measuring, during the phase for which fuel injection is cut off, the gas torque Cg for two consecutive engine half revolutions, the variation in torque from one half wheel 2 to the other corresponding to the difference between the two measurements of Cg, calculates half of this difference and stores it in memory in a table, over the entire speed range of the engine between a speed close to low idle (for example 1200 rpm) and maximum speed, with consecutive speed regions 200 rpm or 500 rpm apart for example. Defects in symmetry of the target 2 are compensated for, in fuel-injection phase and for a given speed N, by adding half the torque discrepancy stored in memory for the speed region containing N to the measurements of Cg obtained with the half of target 2 giving the lowest torque value when fuel injection is cut off, and by taking half the torque discrepancy away from the measurements of Cg obtained with the half of target 2 giving the largest torque value when fuel injection is cut off. As an alternative, half the torque discrepancy stored in memory is weighted by a coefficient which is a function of the load and/or speed N of the engine. Compensation therefore consists in applying a correction which is proportional to the torque half discrepancy when the fuel-injection is cut off, with a proportionality coefficient which may be equal to 1 or may be a function of the load and/or the speed of the engine.

This compensation by adding or subtracting half the discrepancy torque between the two halves of the rotary target 2 is the simple application to four-cylinder four-stroke engines of the most general compensation which consists, for a z-cylinder engine, in calculating, during the phase in which fuel injection is cut off, the value of Cg over each combustion/expansion angular sector of a cylinder, with a value of $$\frac{2 \text{ engine revolutions}}{z},$$

if the engine is a four-stroke engine, or $$\frac{1 \text{ engine revolution}}{z}$$

if the engine is a two-stroke engine, in calculating the mean of the values of Cg over all the sectors, then in calculating, for each sector, the difference between this mean and the value of Cg for this sector, possibly in weighting this difference using a coefficient which is a function of the load and/or the speed of the engine, and then compensating at least partially for the calculated value of Cg for each sector by adding this, possibly weighted, difference to it. The most general compensation therefore consists in applying for each sector, to the values of Cg obtained in the phase in which fuel injection is cut off for this sector, an additive correction factor which is proportional to the discrepancy between the mean of the torques Cg calculated for all the sectors in the phase in which fuel injection is cut off, and the torque Cg calculated for the sector under consideration, also during the phase in which fuel injection is cut off.

The stage 6 thus delivers on its output 8, for each combustion/expansion phase in each cylinder of the engine, a signal representative of the value of the gas torque Cg produced in the corresponding cylinder by the corresponding combustion and corrected for the assymmetry of the target 2.

In parallel with being sent to the engine management system 5 and to the stage 6, the speed signal N is transmitted to a memory stage 9 including shift registers which have a minimum storage capacity corresponding to three successive phases of the engine cycle. This stage 9 also receives, from a corresponding sensor 10, a signal representative of the inlet air pressure Pim at the inlet manifold, as well as, possibly, an engine phase signal allowing each cylinder to be identified, and which is received from an engine phase sensor 11, which need not necessarily be present in the device or for implementing the method according to the invention.

The engine phase sensor 11 is of a known type, with a structure similar to that of the position detector 1, and comprising a toothed wheel or crown gear 12 rotationally integral with a camshaft, and the teeth of which run past a sensor 13 fixed to the engine.

The signals regarding engine speed N, and pressure at the inlet manifold Pim for at least the latest three successive phases of engine cycle, together with the numbers of the corresponding cylinders are thus stored as a rolling record in the memory stage 9. This stage 9 is connected to a stage 14 for resynchronizing the events, making it possible to search through the values of speed N and of Pim stored in the stage 9 for those which, bearing in mind the engine cycle, correspond to a combustion/expansion phase for which the gas torque Cg is in the process of being calculated in the stage 6. This is because there is a desire to compare with the measured gas torque Cg a theoretical expected gas torque calculated on the basis of the values of speed and of Pim which led to this measured gas torque Cg. It is known that the gas torque Cg is the result of combustion which took place during the previous combustion/expansion phase, that is to say in the previous engine half revolution, for a four-cylinder four-stroke engine. This combustion is a function of the amount of fuel injected which, itself, depends on the corresponding speed and Pim conditions during the inlet phase, that is to say during the third half revolution before the calculation of the gas torque. This is why the speed N and the pressure Pim are measured during the inlet phase or inlet half revolution preceding the combustion/expansion half revolution during the same engine cycle in the corresponding cylinder, and that the values measured for at least three successive engine phases are stored in the stage 9. Hence, for a combustion/expansion half revolution of order n, the step 14 searches in the stage 9 for the value of speed N and of pressure Pim of order n−3.

From the stage 14, the speed and Pim values of order n−3 are entered as addresses into a two-entry table contained in the interpolation-map stage 15, this two-entry map giving the values of reference torque as a function of values of speed and of values of Pim, these values not being equally spaced but being close together in those regions of the torque map which have pronounced curvature. Using linear interpolation, the address values are used to deduce a theoretical reference gas torque value Cref. This reference torque map was preestablished, with mean values over 200 engine half revolutions for example when the engine is running in stabilized speed and is used for all cylinders of an engine as well as for a family of engines.

In the same stage 15, the value of the speed signal N of order n−3 is entered as an address into a one-entry table expressing different values of the limiting torque for different values of the speed, the limiting torque corresponding to the gas torque measured at zero useful torque (for the same speed), that is to say at the limiting torque below which the engine is driven. By linear interpolation in this table of the limiting torque, a value of the limiting torque Clim is deduced for the value of the speed in the phase of order n−3.

Hence, in the stage 15, for each $n^{th}$-order combustion/expansion phase or half revolution, linear interpolation in the two-entry table is used to calculate a value Cref from the values of speed N and of Pim in the half revolution of order n−3, and in parallel, linear interpolation in the one-entry table expressing the limiting torque as a function of the speed is used to calculate the value of limiting torque Clim corresponding to the value of the speed N for the half revolution of order n−3. This limiting torque Clim is used to determine whether the engine is driving or being driven, depending on whether an expected theoretical gas torque Cpr defined below is respectively greater than or less than Clim.

It will be understood that in transient phase, when the engine is being driven, and/or in the event of a worn engine, the reference torque Cref may differ appreciably from the calculated gas torque Cg. In order to make the best possible evaluation of the torque supplied by the engine during each half revolution, a multiplicative correction factor KM is therefore applied to the corresponding value of the reference torque Cref. This operation is carried out in the multiplier stage 17, which receives the signal Cref from the stage 15 and the correction coefficient KM from the stage 16. In the latter, the coefficient KM is calculated, for each combustion/expansion phase, from a given number m of the latest consecutive Cg/Cref ratios for the cylinder corresponding to the combustion/expansion phase under consideration. If z is the number of cylinders in the engine, then the general formula expressing KM is:

$$KM = \frac{1}{m}\left[\sum_{i=1}^{i=m} Cg\,n - iz/Crefn - iz\right]$$

In this example, KM is a mean, for example, of the latest four Cg/Cref ratios for each cylinder under consideration. That makes it possible to take account of the spread between cylinders, between engines, and of the ageing of the engine, and to improve the accuracy of the expected theoretical gas torque Cpr calculated in the stage 17 by multiplying Cref by KM.

The stage 17 thus delivers a signal Cpr.slow=KM×Cref.

For a cylinder under consideration, the oldest Cg/Cref ratio was calculated for the half revolution of order n−16, because the engine is a four-cylinder engine and the mean of the latest four ratios per cylinder is being considered. The coefficient KM is thus given by the formula:

KM=¼ [Cg n−16/Cref n−16+Cg n−12/Cref n−12+Cg n−8/Cref n−8+Cg n−4/Cref n−4].

Figure 2:
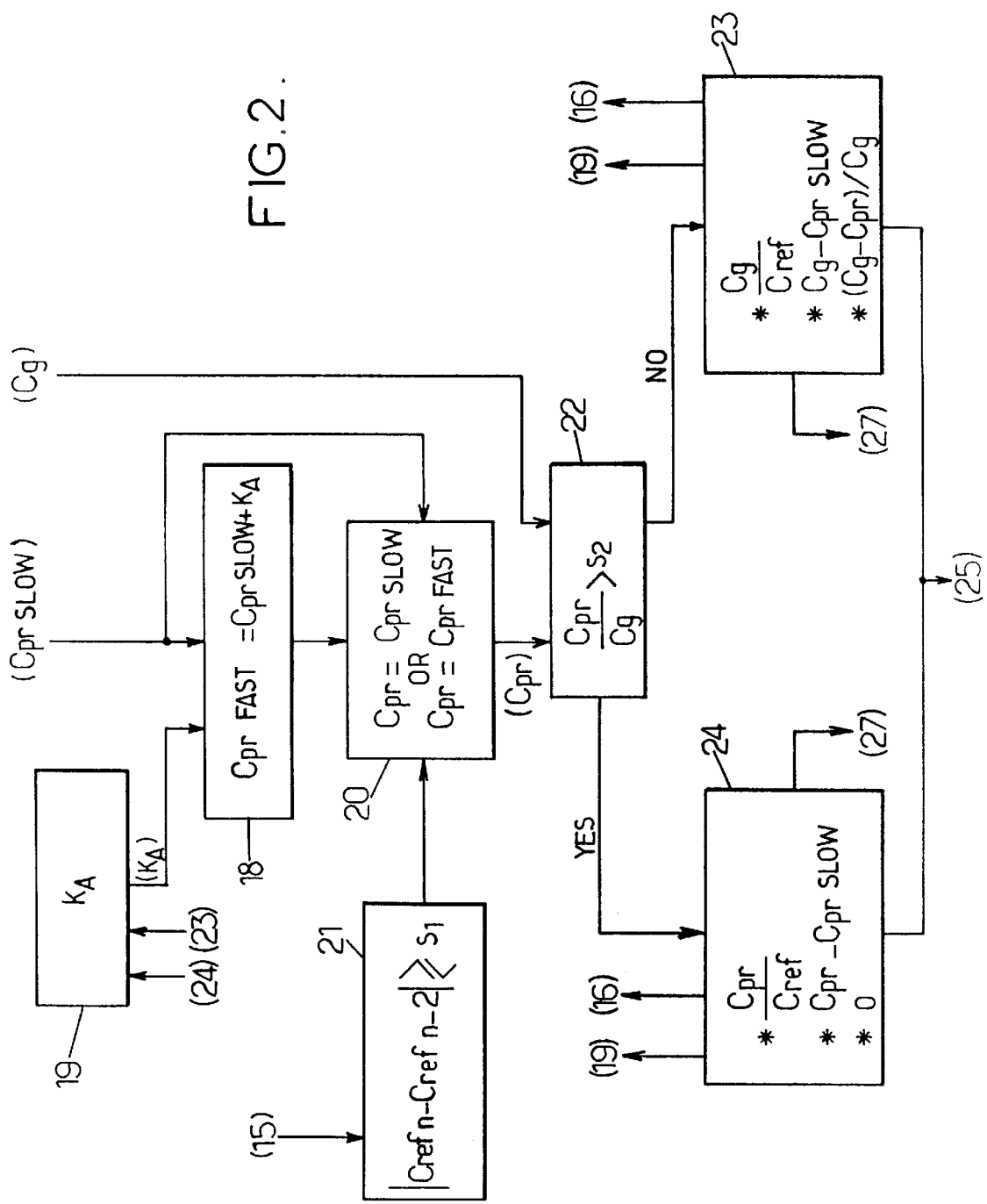
Figure 3:
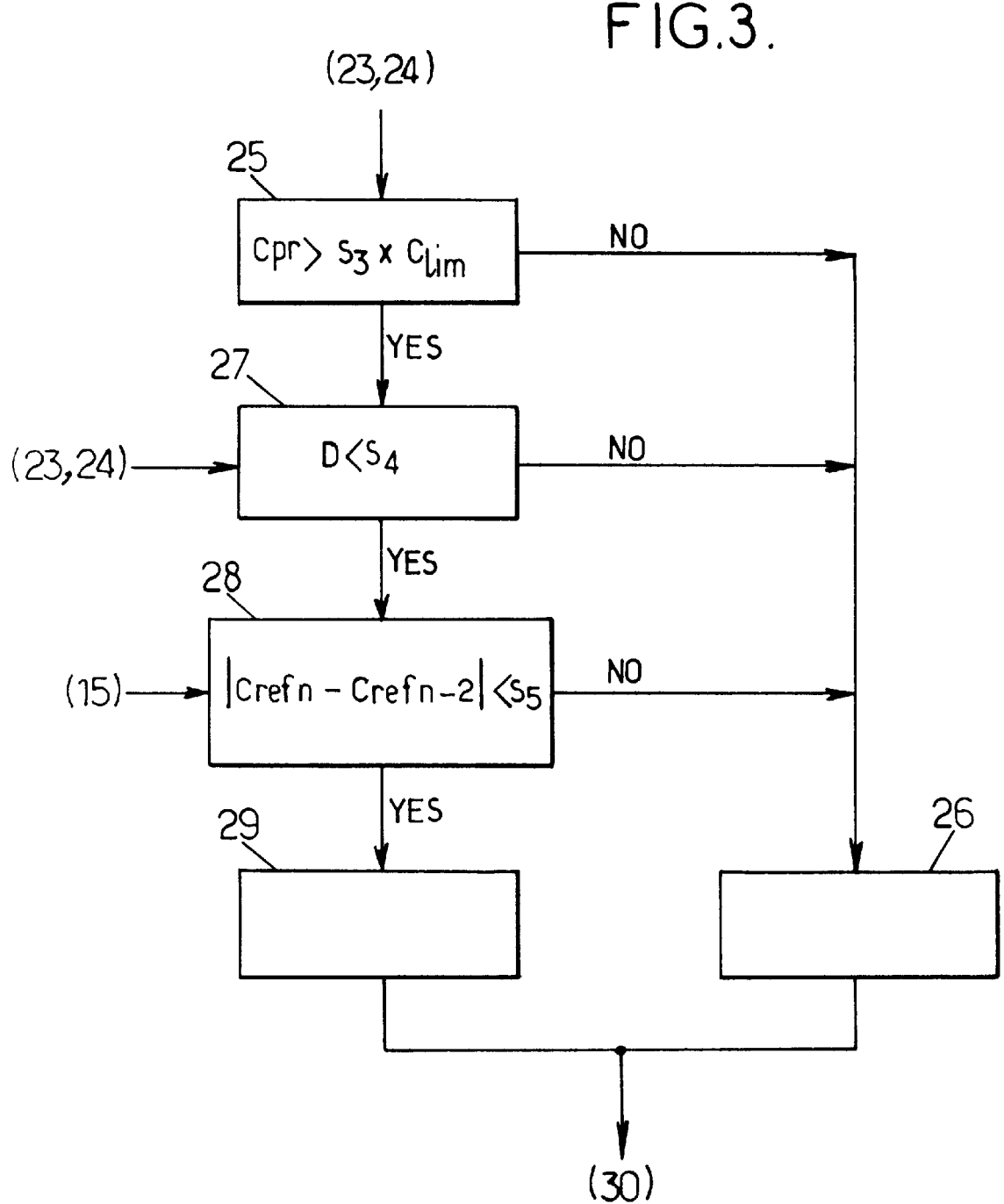
Figure 4:
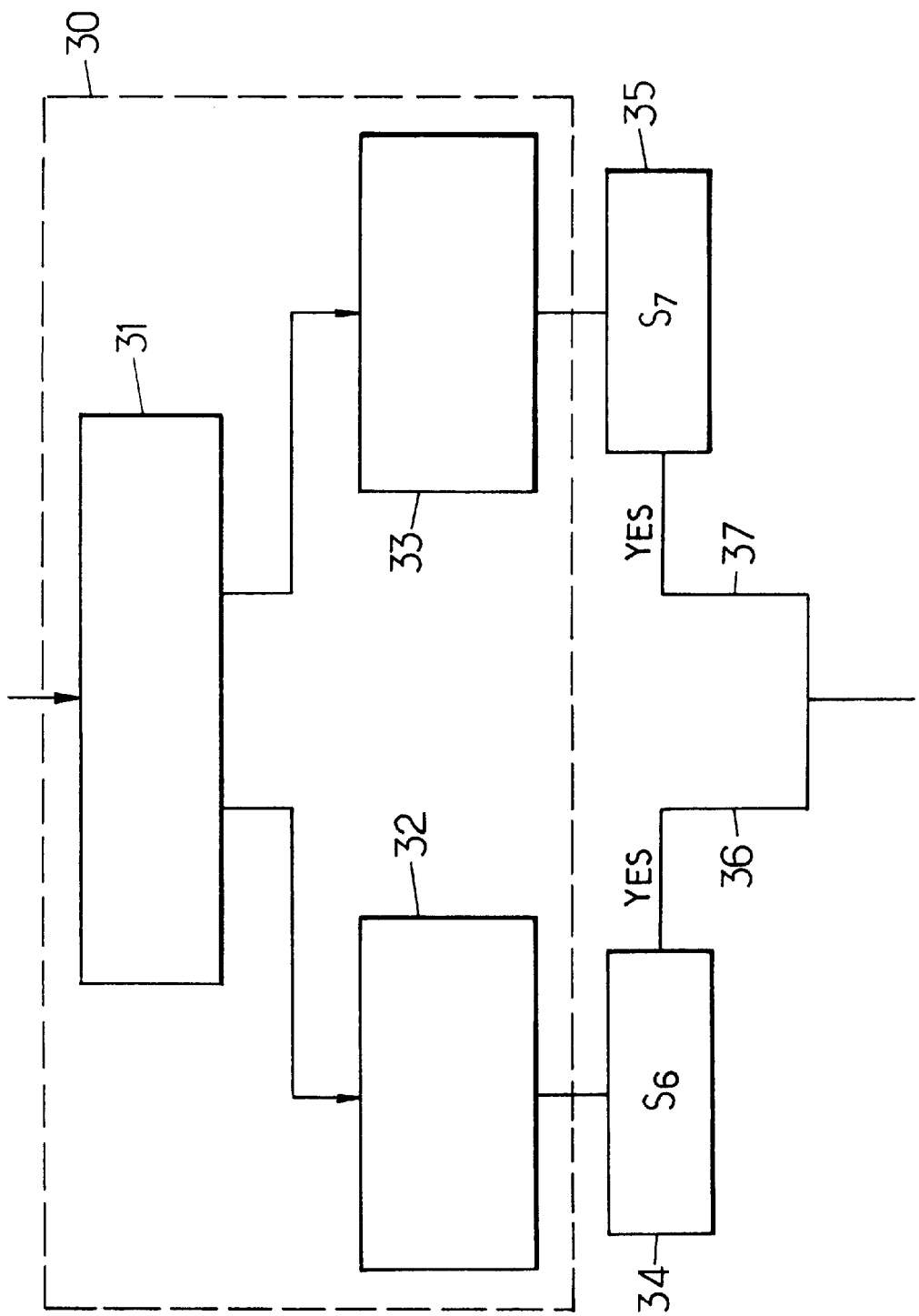

In order to be able to calculate KM it is therefore necessary, during the first sixteen half revolutions after the engine is started, to store Cg and Cref in memory. Having completed this initialization phase, all that is required thereafter is for KM to be calculated in the stage 16, then for the value Cpr.slow to be calculated in the stage 17. This value Cpr.slow is transmitted to the adder stage 18 (see FIG. 2) which adds to it an additive correction factor KA received from the stage 19 to deliver a value Cpr.fast=Cpr.slow+KA. The additive correction factor KA is formulated in the stage 19 and recalculated for each combustion/expansion phase so as to compensate for the transient running mode of the engine. KA, which is positive during acceleration and negative during deceleration is, for example, equal to the first-order filtering of the difference [Cg−Cpr.slow] independently of the cylinder under consideration.

The signal Cpr.slow is transmitted in parallel to the selection stage 20 which also receives the signal Cpr.fast from the stage 18, and choses as expected theoretical torque signal Cex either Cpr.slow or Cpr.fast depending on whether it receives from the stage 21 evaluating whether the engine is running in stabilized or in transient mode either a stabilized-running signal or a transient-running signal, respectively. Thus the following test is carried out in the stage 21: the value of the reference torque Cref for the half revolution in progress, of order n, and for the prior half revolution of order n−2 are considered. If the absolute value of the difference between these two values of Cref is higher than a threshold S1, for example equal to 3 Nm, then the engine is deemed to be in a transient state. By contrast, if the absolute value of the difference between these two values of Cref has been below the threshold S1 for at least a given number of the latest consecutive half revolutions, for example for at least sixteen half revolutions which correspond to four engine cycles, then the engine is deemed to be in a stabilized state. The stage 21 receives Cref n and Cref n−2 from the stage 15.

Now that the values of Cg and Cpr have been thus obtained, they are transmitted to the test stage 22 which searches for a misfire by comparing these two values.

This comparison consists in calculating the Cpr/Cg ratio and in comparing it with a threshold S2 which is predetermined and stored in memory in 22, it being possible for S2 to be constant, for example equal to 2, in a simplified alternative form of the method. However, in the best embodiment known to the applicant, the threshold S2 is taken from a map table established as a function of the engine speed N and of the pressure at the inlet manifold Pim.

There is deemed to be a misfire if Cpr/Cg is above S2.

If this condition is not satisfied, then the absence of a misfire is detected in the stage 23, and there are stored in memory in this stage the values, for this phase of order n, of the ratio Cg/Cref, transmitted to the stage 16 for calculating the multiplicative correction factor KM, and of the difference (Cg−Cpr.slow), transmitted to the stage 19 for calculating the additive correction factor KA, as described hereinabove.

The ratio $$\left(\frac{Cg - Cpr}{C\hat{g}}\right)$$

needed to calculate the drift in Cpr with respect to Cg as described hereinbelow is also calculated and stored there.

If the condition tested for in the stage 22 is satisfied, then a misfire is detected in the stage 24, in which there are stored in memory the values of the Cpr/Cref ratio and of the difference (Cpr−Cpr.slow), in which values Cpr takes the place of Cg for this phase of order n, so as not to deliberately false the following calculation of the multiplicative correction factor KM and additive correction factor KA because the values stored in memory in the stages 23 and 24 are taken into account in the stages 16 and 19 for this purpose.

The Cpr/Cref ratio is therefore transmitted from the stage 24 to the stage 16 and the difference (Cpr−Cpr.slow) from the stage 24 to the stage 19. In addition, the value 0 (corresponding to the $$\frac{Cg - Cpr}{C\hat{g}}$$

ratio when Cg is replaced by Cpr) is stored in memory in the stage 24 for calculating the drift in Cpr with respect to Cg as described hereinbelow.

Whether or not a misfire is detected in phase n, the process then checks that it is not in one of the main conditions which lead to detection being deactivated.

To this end, the stage 25 is interrogated to see whether the engine is driving, by comparing the expected torque Cpr with the product of the limiting torque Clim times a threshold coefficient S3 stored in memory in 25 and less than or equal to 1.

If Cpr≦S3×Clim, then the engine is deemed to be driven and detection in the stage 26 is deactivated.

If Cpr>S3×Clim, then the engine is deemed to be driving, and the process goes onto the stage 27 to assess the drift in Cpr with respect to Cg.

For that, there is calculated in 27 an expected-torque drift D equal to the mean of the ratio $$\left(\frac{Cg - Cpr}{C\hat{g}}\right),$$

stored in memory in 23 and 24 over the latest four combustion/expansion phases, ie:

$$D = \frac{1}{4}\left[\left(\frac{Cg - Cpr}{C\hat{g}}\right)_n + \left(\frac{Cg - Cpr}{C\hat{g}}\right)_{n-1} + \left(\frac{Cg - Cpr}{C\hat{g}}\right)_{n-2} + \left(\frac{Cg - Cpr}{C\hat{g}}\right)_{n-3}\right]$$

and D is compared with a drift threshold S4, for example constant and equal to 0.4 or 40%.

When the misfire detection threshold S2 (with which Cpr/Cg is compared) is taken from a map, then the drift threshold S4 is advantageously a calibration threshold expressed as a % of the misfire threshold S2.

If D≧S4, then the drift in the expected torque Cpr with respect to Cg is deemed to be excessive and detection is deactivated at 26 until the drift D drops back below the threshold S4.

If D<S4, then in the next stage 28 the absolute value of the difference between Cref n and Cref n−2, which value has already been calculated and taken into account in the stage 21, is compared with a threshold S5 which, for simplification, may be equal to the threshold S1 of the stage 21. If |Cref.n−Cref.n−2|≧S5, then the engine is deemed to be in transient mode for which deactivation of detection is commanded at 26. In the contrary case, as none of the three aforementioned main conditions for deactivating is satisfied in the stages 25, 27 and 28, then the detection carried out is validated at 29.

An additional condition for deactivating detection consists in keeping the detection deactivated for as long as there has not been, in the stage 6, learning for compensating for the defects in symmetry of the tachymetric target 2, and therefore for as long as there has not been a definition of at least one term for compensating for the variations in torque when fuel injection is cut off which can be used for all the engine speeds in at least one speed range containing the speeds for which the corresponding cut-off of fuel injection occurred.

Detection may be deactivated when other conditions are encountered, for example a cut-off in fuel injection, an engine coolant temperature below a threshold, etc.

The results of the detections (presence or absence of misfires) are transmitted to a stage 30 known as a "gating stage" in which there are stored at 31 the detection results for all the combustion/expansion phases in segments of 1000 engine revolutions, that is to say the detection results for 2000 engine half revolutions. These results are processed, on the one hand, in a 200-engine revolutions window 32, in which the level or number of misfires is calculated in segments of 200 engine revolutions, that is to say in detections made over 400 half revolutions. On the other hand, these detection results are processed in a 1000-engine revolution window 33 where the level or number of misfires in detections made over 2000 engine half revolutions is calculated in a similar way.

The level (or number) calculated at 32 in the 200-revolutions window is compared, in the comparator 34, with a threshold S6 which is predetermined and constant, and which when exceeded leads to the emission at 36 of a warning signal indicating degradation of the catalytic converter.

Likewise, the level (or number) calculated at 33 in the 1000-revolutions window is compared, in the comparator 35, with an emission threshold S7, which is constant and for example of the order of 1.5%, the exceeding of this threshold being indicated by a warning signal at 37 indicating an excessively high level of harmful components in the exhaust gases. These warning signals may, for example, cause the lighting of a lamp on the instrument panel of the vehicle.

As an alternative, it is possible, in the method and device described hereinabove, to reverse the processing applied to the values of Cg and Cref, and therefore correct the values of the gas torque Cg into values of calculated gas torque Cgc in order to compare them with values of the reference torque which are interpolated but not corrected by the multiplicative and additive correction factors.

Each of the two variables Cg and Cref may possibly be corrected for in a way which is specific to it so as to obtain values Cgc and Cpr the ratio Cex/Cgc of which is compared with the misfire detection threshold.

In the example described hereinabove, the values of Cg may be deemed to have been corrected by a multiplicative coefficient KM=1 and by an additive correction term KA=0 such that Cg=Cgc.

In another alternative form, any other signal representative of the unitary filling of the cylinders of the engine, for example a signal regarding the inlet airflow or a signal regarding the degree of openness of the rotary choke or butterfly valve controlling or regulating the air supply to the engine may be taken into account as a substitute for taking into account the pressure at the air inlet manifold Pim.

We claim:

1. A method for detecting misfires in a controlled-ignition internal combustion engine, comprising the steps of:
    a) formulating, for a combustion/expansion phase in each corresponding cylinder of the engine, a signal representative of a value of a gas torque (Cg) produced in the corresponding cylinder by a corresponding combustion,
    b) measuring a rotational speed (N) of the engine and formulating a signal representative of the rotational speed for at least an inlet phase which preceded the combustion/expansion phase in the corresponding cylinder,
    c) measuring a parameter representative of a unitary filling of the corresponding cylinder and formulating a signal representative of the unitary filling for at least the inlet phase which preceded the combustion/expansion phase during a same engine cycle in the corresponding cylinder,
    d) entering the signals representative of the speed (N) and of the unitary filling as addresses in a reference theoretical gas torque map, and deducing from the torque map a signal representative of a reference torque (Cref),
    e) i) assigning to at least one of the signals representative of the value of the gas torque (Cg) and of the reference torque (Cref) a respective multiplicative correction factor (KM) associated with the corresponding cylinder so as to obtain proportional signals which are proportional to the value of the gas torque (Cg) and to the reference torque (Cref) respectively, and, ii) assigning to at least one of the proportional signals, an additive correction factor (KA) when the engine is running in a transient mode, and deducing therefrom a signal representative of an expected theoretical torque (Cpr) on a basis of the signal which is proportional to the reference torque (Cref), and a signal representative of a calculated gas torque (Cgc) on a basis of the signal which is proportional to the value of the gas torque (Cg), and
    f) calculating a ratio of the signal representative of the expected theoretical torque (Cpr) to the signal representative of the calculated gas torque (Cgc), and deeming there to be a misfire when this ratio is higher than a given ratio threshold (S2).

2. A method as claimed in claim 1, and further including the step of taking the given ratio threshold (S2) from a map established as a function of the rotational speed (N) of the engine and of a parameter representative of the unitary filling of the cylinders of the engine.

3. A method as claimed in claim 1, and further including the step of adopting a pressure Pim at an air inlet manifold for the corresponding cylinder as a parameter representative of the unitary filling of the cylinders of the engine.

4. A method as claimed in claim 1, and further including the steps of (a) assigning the multiplicative correction factor (KM) only to the signal representative of the reference torque (Cref); and, (b) when the engine is running in the transient mode, assigning the additive correction factor (KA) only to a corresponding proportional signal.

5. A method as claimed in claim 1, and further including the step of formulating the signal representative of the calculated gas torque (Cgc) on a basis of an engine angular position signal.

6. A method as claimed in claim 1, and further including the steps of (a) calculating the gas torque (Cg) for each angular sector of rotation of the engine corresponding respectively to the combustion/expansion phase of each cylinder of the engine; (b) over at least one engine cycle, with a fuel injection being cut off at least at a given engine speed which is higher than a speed close to a low idle speed, calculating a mean of the gas torques (Cg) for all of the annular sectors; (c) defining, for each sector, a corresponding compensation term which is equal to a product of a difference between the mean of the torques and the gas torque for this sector times a proportionality coefficient which is one of equal to 1, or a function of the load or the speed (N) of the engine; and (d) adding, for each sector, the corresponding compensation term to the gas torque (Cg) obtained in the inlet phase for this sector over at least one speed range containing the speeds for which the fuel-injection cut-off was applied.

7. A method as claimed in claim 6, wherein the engine is a four-stroke four-cylinder engine, and further including the steps of (a) calculating the gas torque (Cg) for each of at least two successive engine half revolutions, with the fuel injection cut off; (b) calculating half of a resulting torque variation from one engine half revolution to a next engine half revolution; (c) defining a compensation term as being equal to a product of half the torque variation times the proportionality coefficient; and (d) one of adding the compensation term to the gas torque values (Cg) obtaining during a fuel-injection phase for the engine half revolutions which gave a lowest gas torque value in the phase during which the fuel injection was cut off, or respectively taking the compensation term away from the gas torque values (Cg) obtained in the fuel-injection phase for the engine half revolutions giving a highest gas torque value (Cg) in the phase when fuel injection was cut off, over said speed range.

8. A method as claimed in claim 1, and further including the step of deducing the reference torque signals (Cref) from an overall torque map for all of the cylinders of the engine which is valid for a family of such engines, this map being preestablished with the engine at a stabilized speed and stored in memory in a form of a tabulated map with two entries expressing the values of the theoretical reference gas torque (Cref) for different values of the engine speed (N) and the pressure at the inlet manifold (Pim), which values are selected in order to optimize a calculation of the reference torque (Cref) by linear interpolation.

9. A method as claimed in claim 1, and further including the step of calculating the multiplicative correction factor (KM) for each combustion/expansion phase of the engine as being equal to a mean of the correction factors (KM) of a given number of latest consecutive gas torques to reference torques (Cg/Cref) ratios for a cylinder corresponding to the combustion/expansion phase under consideration.

10. A method as claimed in claim 1, and further including the step of making the additive correction factor (KA) equal to a first-order filtering of a difference between the signals representative of the calculated gas torque (Cgc) and of the expected theoretical torque (Cpr) at a stabilized speed, independently of the cylinders.

11. A method as claimed in claim 1, and further including the steps of determining whether the engine is running in a stabilized or in the transient mode as a function of a difference in absolute value between two values of the reference torque (Cref) which are calculated (a) for a combustion/expansion phase under consideration and (b) for a previous last but one combustion/expansion phase; and deeming the mode to be transient if this difference is higher than a given threshold (S1) and to be stabilized if this difference is below said threshold (S1) for a given number of consecutive engine cycles.

12. A method as claimed in claim 9, and further including the steps of storing in memory a given number of the latest successive values of the ratio of the gas torque (Cg) to the reference torque (Cref) and a latest value of the additive correction factor (KA) which are needed to calculate the multiplicative and additive correction factors (KM, KA); and storing a corresponding calculated value of the expected torque (Cpr) in place of a value of the gas torque (Cg) if a misfire is detected for this value of the expected torque (Cg).

13. A method as claimed in claim 1 wherein the engine is equipped with a catalytic converter, and further including the steps of:
    measuring a number of the misfires detected during first and second windows of respectively N1 and N2 engine revolutions,
    comparing measurements of the number of misfires with first and second thresholds (S6, S7) specific to the respective first and second windows, and
    giving (a) a warning signal corresponding to a critical state of the catalytic converter when the first threshold (S6) specific to the first window is being exceeded, and (b) a warning signal corresponding to a threshold of an emission of harmful components in exhaust gases being exceeded when the second threshold (S7) specific to second window is being exceeded.

14. A method as claimed in claim 1, and further including the step of deactivating the deeming of misfires step in phases in which a fuel injection to the engine is cut off and in phases in which the engine is being driven, the engine driven phase being detected when a pressure at an inlet manifold (Pim) drops below a pressure threshold which is a function of the rotational speed (N) of the engine and when the expected torque (Cpr) is lower than a limiting torque which corresponds to the calculated gas torque (Cgc) for zero useful torque for the same rotational speed (N) of the engine.

15. A method as claimed in claim 14, and further including the steps of (a) entering the speed signal (N) as an address into a single-entry table expressing values of the limiting torque for different values of the speed (N) of the engine, and (b) deducing therefrom, by linear interpolation, a signal representative of a limiting torque (Clim) which is compared with the expected theoretical torque (Cpr) in order to deduce therefrom whether the engine is driving or being driven depending on whether the expected theoretical torque (Cpr) is greater than or is lower than the limiting torque (Clim).

16. A method as claimed in claim 15, and further including the step of deactivating the deeming of misfires step if the expected torque (Cpr) is less than a product of the limiting torque (Clim) times a selected factor (S7) which is less than or equal to 1.

17. A method as claimed in claim 1, and further including the step of deactivating the deeming of misfires step if an absolute value of a difference between reference torques (Cref) for the combustion/expansion phases of orders n and n−2 is above a threshold (S5).

18. A method as claimed in claim 1, and further including the step of deactivating the deeming of misfires step when an excessive drift occurs in the signals representative of the calculated gas torque (Cgc) and of the expected theoretical torque (Cpr) one with respect to the other.

19. A method as claimed in claim 18, and further including the steps of (a) deeming there to be excessive drift when a mean value of a ratio of a difference of calculated gas torque minus expected theoretical torque with this difference divided by the calculated gas torque (Cgc−Cpr)/Cgc calculated for a given number of latest combustion/expansion phases exceeds a calibration threshold (S4); and (b) reactivating the deeming of misfires step as soon as said mean value drops back below the calibration threshold (S4).

20. A method as claimed in claim 6, and further including the step of deactivating the deeming of misfires step for as long as there has been no definition of the term for compensating for variations in torque when fuel injection is cut off.

21. A method as claimed in claim 8, and further including the step of substituting for the signal (Pim) a signal relating to one of (a) an air flow rate or (b) a degree of openness of a butterfly valve controlling an air supply.

22. A device for detecting misfires in a controlled-ignition internal combustion engine, for implementation of a method having steps of:
    a) formulating, for a combustion/expansion phase in each corresponding cylinder of the engine, a signal representative of a value of a gas torque (Cg) produced in the corresponding cylinder by a corresponding combustion, b) measuring a rotational speed (N) of the engine and formulating a signal representative of the rotational speed for at least an inlet phase which preceded the combustion/expansion phase in the corresponding cylinder, c) measuring a parameter representative of a unitary filling of the corresponding cylinder and formulating a signal representative of the unitary filling for at least the inlet phase which preceded the combustion/expansion phase during a same engine cycle in the corresponding cylinder, d) entering the signals representative of the speed (N) and of the unitary filling as addresses in a reference theoretical gas torque map, and deducing from the torque map a signal representative of a reference torque (Cref), e) i) assigning to at least one of the signals representative of the value of the gas torque (Cg) and of the reference torque (Cref) a respective multiplicative correction factor (KM) associated with the corresponding cylinder so as to obtain proportional signals which are proportional to the value of the gas torque (Cg) and to the reference torque (Cref) respectively, and, ii) assigning to at least one of the proportional signals, an additive correction factor (KA) when the engine is running in a transient mode, and deducing therefrom a signal representative of an expected theoretical torque (Cpr) on a basis of the signal which is proportional to the reference torque (Cref), and a signal representative of a calculated gas torque (Cgc) on a basis of the signal which is proportional to the value of the gas torque (Cg), and f) calculating a ratio of the signal representative of the expected theoretical torque (Cpr) to the signal representative of the calculated gas torque (Cgc), and deeming there to be a misfire when this ratio is higher than a given ratio threshold (S2);

said device comprising:
- at least one sensor for sensing a rotational speed of the engine, and for delivering a speed signal (N),
- at least one sensor for sensing a parameter representative of a unitary filling of the cylinders of the engine, and for delivering a signal representative of this parameter,
- a torque calculating means for calculating the gas torque (Cg) based on the engine speed signal (N),
- a memory means for storing the gas torque maps and the thresholds,
- a calculation means for calculating and for storing values of the reference torque (Cref), of the expected torque (Cpr), of the calculated gas torque (Cgc), of the multiplicative and additive correction factors (KM, KA), and of the Cpr/Cgc ratio, and
- a comparison means for comparing the stored values with thresholds (S1, S2, S3, S4, S5) in order to determine the presence of misfires.

\* \* \* \* \*